US005914158A

United States Patent [19]

McGuiness

[11] Patent Number: 5,914,158

[45] Date of Patent: Jun. 22, 1999

[54] STATIC CLING GREETING CARD

[76] Inventor: Robert Gary McGuiness, 637 Humboldt St., Eureka, Calif. 95501

[21] Appl. No.: 08/968,667

[22] Filed: Nov. 12, 1997

[51] Int. Cl.[6] .............................. B32B 3/06; B32B 27/30; B42D 15/02

[52] U.S. Cl. .............................. 428/13; 229/92.8; 428/46

[58] Field of Search .............................. 428/13, 43, 46, 428/7; 229/92.8

[56] References Cited

U.S. PATENT DOCUMENTS

| | | | |
|---|---|---|---|
| 2,363,472 | 11/1944 | Ritter | 229/92.8 |
| 4,024,656 | 5/1977 | Farnsworth | 40/121 |
| 4,200,222 | 4/1980 | Feuer | 229/92.8 |
| 4,439,941 | 4/1984 | Halperin | 40/124.191 |
| 4,652,239 | 3/1987 | Brimberg | 428/43 X |
| 5,010,671 | 4/1991 | Stonehouse | 428/43 X |
| 5,102,171 | 4/1992 | Saetre | 428/7 X |
| 5,258,214 | 11/1993 | Cooledge et al. | 428/43 |

*Primary Examiner*—Henry F. Epstein
*Attorney, Agent, or Firm*—Patent & Trademark Services; Thomas Zack; Joseph H. McGlynn

[57] ABSTRACT

A card with a removal and reusable covering thin transparent vinyl layer sheet with indicia thereon and a backing material sheet layered under said vinyl layer sheet and removably retained thereto by static cling without the use of adhesives there between. The covering vinyl sheet may cover part or all of one side of the backing material sheet such as in a folded greeting or a unfolded postcard, respectively. The indicia may take on almost any form of visual data including letters, words, pictorial representations, drawings, photographs, logos or any combination thereof. When the vinyl layer sheet is removed from the backing sheet, it may be placed on any flat smooth surface, such as a glass window pane, as long as static cling can hold the removable vinyl layer sheet thereto.

1 Claim, 2 Drawing Sheets

STATIC CLING GREETING CARD

BACKGROUND OF THE INVENTION

Postcard and foldable greeting type cards have long been sent and used to express and convey many types of feelings or notices from a sender to a receiver. With some such cards part or most of a layered surface with indicia thereon can be detached from a support backing and saved for further use and display on another supporting surface. This removed card layer sheet usually has some type of indicia to be saved which indicia may contain written words, letters, pictorial representations, photographs, logos or any combination thereof. In many cases the removal layer or segment has been fastened or bonded to the backing with an adhesive that may be very slow setting thereby insuring the easy removably between the interfacing removed layer and its support backing. The removed layer with the material desired to be saved can then be placed against another type of support backing such as a window, door, refrigerator, or just about any flat surfaced object the adhesive may adhere to. Depending on the nature of the adhesive used the removed layer may, either not stick to the new surface, bond easy and permanently to it or adhere to it such that it can be removed by hand and reused in the future.

The present invention relates to a removable and reusable vinyl sheet layer with indicia thereon used with a postcard or greeting card type backing that employs no adhesive or bonding material between the removable layer and its backing which removed layer can be used on a great variety of supporting surfaces all as further described herein.

DESCRIPTION OF THE PRIOR ART

The prior art discloses mailable greeting and other cards that have removable backings. For example, in U.S. Pat. No. 2,363,472 to Ritter a mailing card is disclosed that has a removable and reusable transfer material which is securely adhered by a suitable adhesive at its upper and lower marginal edges to the card.

In the Farnsworth reference (U.S. Pat. No. 4,024,656) a card backing with a calendar has scored and/or die cuts to permit the calender to be removed from the backing and rest of the card and reused separately.

The card in the Feuer invention (U.S. Pat. No. 4,200,222) has a removable decal secured to one side by adhesive to the card's backing.

And in U.S. Pat. No. 4,439,941 to Halperin a card with a removable and reusable design containing insert is disclosed. The insert has a layer of thermoplastic adhesive which by the application of heat and/or pressure permits its reuse on an article of clothing or the like. The present invention differs from this cited art and the known prior art by providing for a removable, reusable layer of sheet material with indicia thereon that is kept in contact with a supporting backing surface by static cling and which can be removed and placed on another backing surface using the principle of static cling all as more further set forth in this specification.

SUMMARY OF THE INVENTION

This invention relates to a postcard type backing with a removable and removable sheet layer with indicia thereon. This layer is held to the backing without the use of an adhesive material using the principle of static cling. The removable sheet layer may be made of a transparent material with the indicia consisting of letters, pictorial representations, photographs, logos or any combination thereon imprinted in the material. Normally, the removable sheet is placed on any substantially smooth non-porous surface such as a window, refrigerator, mirror or the like.

It is the primary object of the present invention to provide for an improved removable and reusable layer of material that has indicia thereon.

Another object is to provide for such a layer that can cling to a postcard type backing and be mailed and then removed for use on many types of different smooth surfaces all without the use of adhesive materials.

These and other objects and advantages of the present invention will become apparent to readers from a consideration of the ensuing description and the accompanying drawings.

DESCRIPTION OF THE PREFERRED EMBODIMENT

Figure 1:
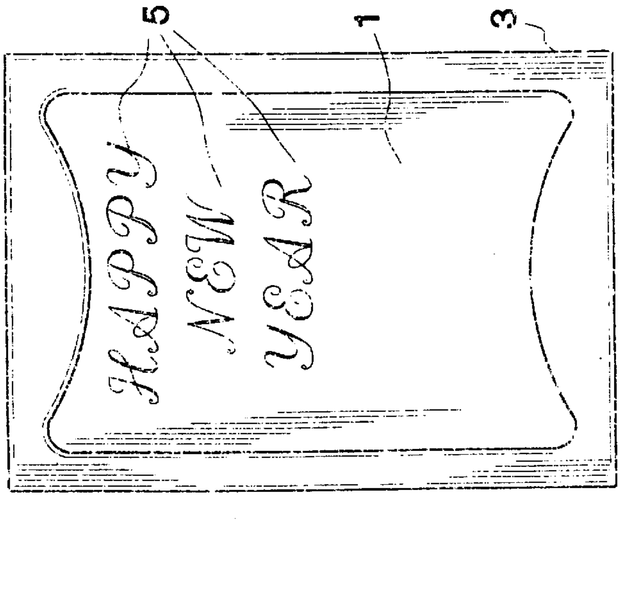
FIG. 1 is a front view of the invention's preferred embodiment on a postcard backing.

FIG. 1 is a front view of the invention's preferred embodiment. In this view the transparent vinyl layer sheet 1 is mounted over a postcard backing material 3 of substantially the same size and dimensions located directly behind and covered by it. This layer sheet 1 thus substantially covers one of the two exposed surfaces (front and back) of the backing material in this figure. Indicia 5, in this case consisting of the printed or drawn words "HAPPY NEW YEAR", has been applied to the covering vinyl layer sheet. Conceivably any type of data that may be imprinted on or in the vinyl layer sheet can be considered indicia. Thus, indicia may be a photographic image, a printed or drawn letter, a word or words, a pictorial representation or a logo or any combination thereof as the term is used herein. The indicia mounted on the layer sheet 1 whether in the form of a text or image may be optically scanned, downloaded from a computer monitor or created by means of a resin based thermal transfer and applied to the initially clear thin transparent vinyl sheet material 1.

Figure 2:
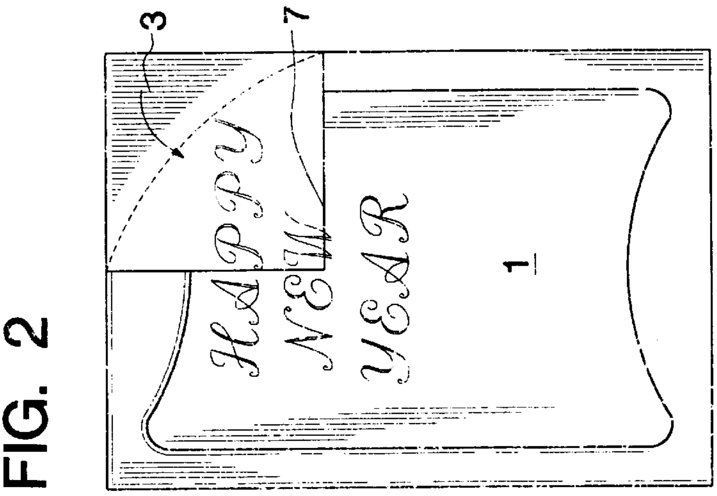
FIG. 2 is a front view of the FIG. 1 embodiment when the covering vinyl sheet has been peeled back at its upper right hand corner part to expose part of the postcard backing.

FIG. 2 is a front view of the FIG. 1 embodiment when the covering transparent vinyl sheet 1 has been peeled back, in the direction of the arrow, at its upper right hand corner part 7 to expose part of the covered postcard backing 3. There is no adhesive material located between the layer sheet 1 and the postcard backing material 3. What retains the removal layer sheet to the backing is the well known phenomena of static cling. Such static cling is believed to be created by charges on the electrically insulating vinyl sheet material in layer 1 being attracted to opposite existing charges on the paper or cardboard backing material in the postcard backing material 3.

Figure 3:
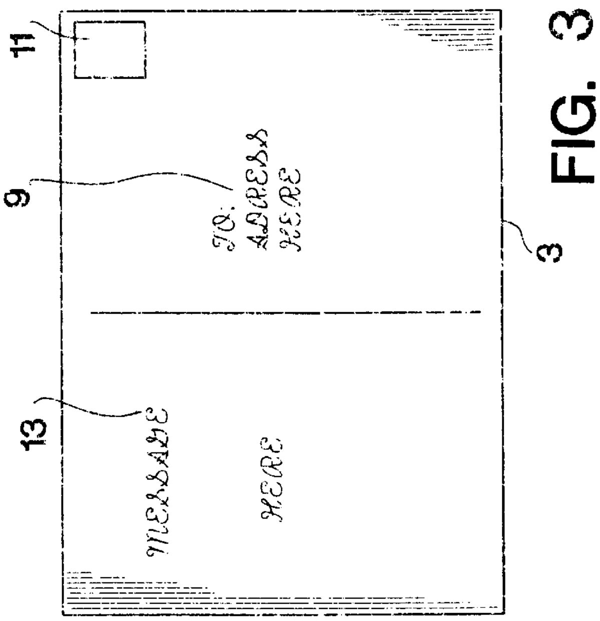
FIG. 3 shows a reverse side view of the postcard backing used in FIGS. 1 and 2.

FIG. 3 shows a reverse side view of the postcard backing 3 used in FIGS. 1 and 2. From all outward appearances this reverse side is a conventional postcard with space for the receiver's address 9, a stamp 11 and a message from the sender 13.

Figure 4:
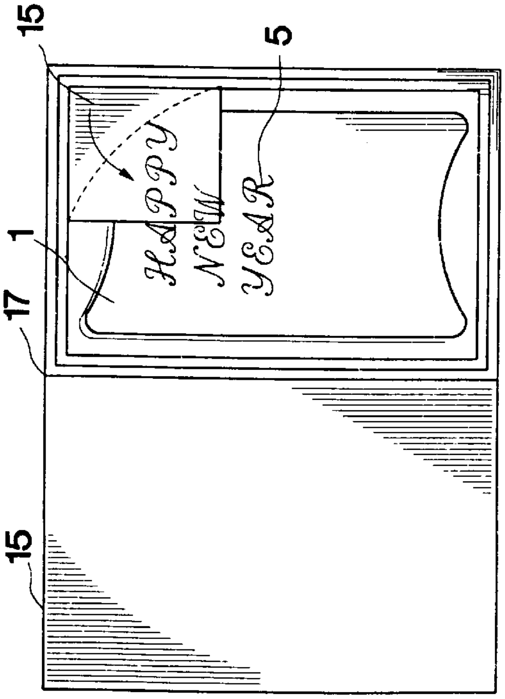
FIG. 4 shows the layer sheet within a foldable card.

FIG. 4 shows the transparent layer sheet 1 within a greeting card backing 15 that can be folded at its midsection 17. The same indicia 5 is visible in this figure as in FIGS. 1 and 2. Similar to FIG. 2 the upper right hand corner of the transparent vinyl layer sheet material 1 has been folded back to reveal the covered backing material 15. However, in this view the foldable greeting card backing material 15 has a defined ratio of area size that is twice the exposed front surface area of the covering layer sheet 1 thereby permitting only half of one exposed backing side to be covered by the thin transparent vinyl layer sheet 1.

Figure 5:
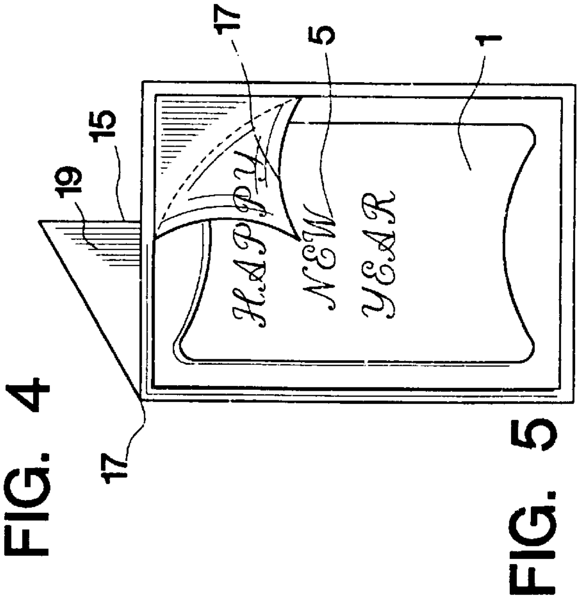
FIG. 5 is a perspective front view of the partially folded backing material of FIG. 4 with its layer sheet when the sheet is mounted on outside of the backing facing front.

FIG. 5 is a perspective front view of the partially folded backing material of FIG. 4 with its layer sheet when the sheet is mounted on outside of the backing facing front. With this type of card backing material a message can be written on the inside face 19 of the backing sheet by the sender as in a conventional greeting card.

Figure 6C:
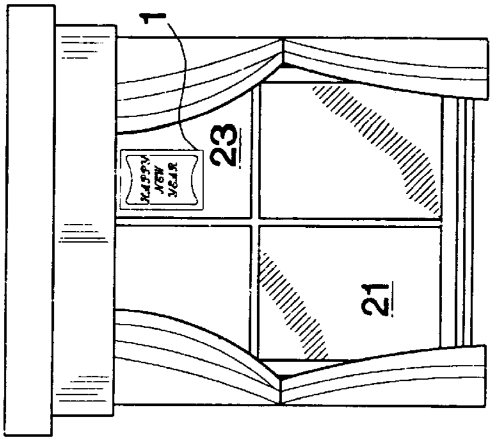
FIGS. 6*a*, 6*b* and 6*c* illustrate the layer sheet when removed from its card backing mounted on a lower left window pane (FIG. 6*a*), the same window without the layer sheet thereon (FIG. 6*b*), and with the layer sheet mounted on the windows upper right hand pane (FIG. 6*c*).
Figure 6A:
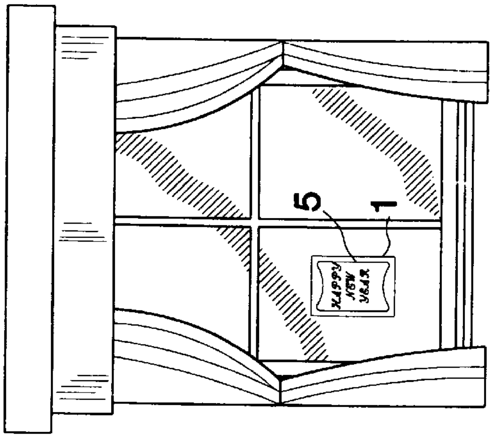
Figure 6B:
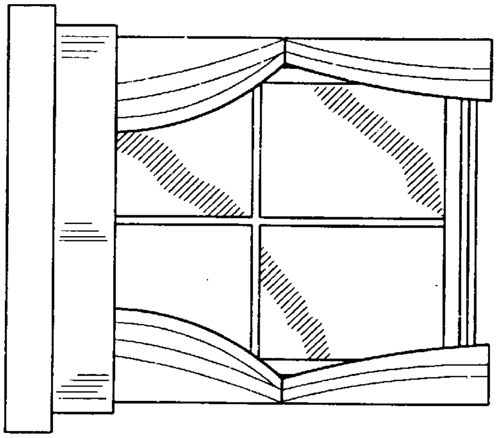

FIGS. 6*a*, 6*b* and 6*c* illustrate the layer sheet when removed from its card backing material 3 or 15 as mounted on a lower left glass window pane (FIG. 6*a*), the same window without the layer sheet thereon (FIG. 6*b*), and with the layer sheet mounted on the window's upper right hand glass pane (FIG. 6*c*). In FIG. 6*a* the vinyl layer sheet 1 with its indicia 5 has been completely peeled off its backing material and transported to the glass window pane 21. Just about any flat smooth surface such as a vertically disposed glass window pane, refrigerator or any other surface material that can be subjected to static cling may be used for this card substituted supporting backing surface. FIG. 6*b* merely shows the same window with the vinyl layer sheet 1 absent. And in FIG. 6*c* the same vinyl layer sheet 1 has been moved from the lower glass pane 21 to the upper right hand glass pane 23. Should it be desired to reuse the same vinyl layer sheet again it can simply be peeled off the window pane and used in the new supporting backing surface such as a new postcard or greeting card backing.

A clear abrasion guard material may or may not be added and layered over the top surface of the layer sheet 1 for additional surface protection. If desired the bonding properties of static cling may be augmented by using an adhesive material between the backing material and the layer sheet 1 should a permanent or semi-permanent bond between these two materials be desired. Further, as an alternative, a pocket or cut out may be formed in the card backing material 3 or 15 to assist in retaining the vinyl layer sheet 1 to the backing surface.

Clearly almost anything data can be considered visual indicia 5 as such is not restricted to printed or written letters, words, drawings, photographic images, logos or any other symbols or characters. The card's backing material need not be a postcard or a greeting card to be mailed. The backing layer may be used for a tag, a notice, a business card and be mailed with or without being inserted into an envelope.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A postcard with a removable and reusable layer sheet, said postcard comprising:

said postcard having a first surface and a second surface, said first surface and said second surface being on opposite sides of said postcard, said first surface having a first designated area means for receiving a postage stamp, said first surface having a second designated area means for receiving a name and address, and said first surface having a third designated area means for receiving a message, said first and second designated area means occupying approximately one half of said first surface, and said third designated area means occupying approximately one half of said first surface, said second surface of said postcard having a designated area for receiving a transparent layer sheet, said transparent layer sheet having indicia thereon, and said transparent layer sheet being secured to said second surface of said postcard by static cling, said transparent layer sheet covering approximately the entire second surface of said postcard.

* * * * *